March 17, 1964   J. A. KASPER   3,125,241
SPOT FOIL
Filed June 23, 1961

INVENTOR.
John A. Kasper,
BY Parker & Carter
Attorneys

United States Patent Office 3,125,241
Patented Mar. 17, 1964

3,125,241
SPOT FOIL
John A. Kasper, Lincoln, Ill., assignor to Stetson China Company, Lincoln, Ill., a corporation of Illinois
Filed June 23, 1961, Ser. No. 119,223
2 Claims. (Cl. 220—63)

This invention relates to molding foils, and has particular relationship to a molding foil useful in the manufacture of plastic dinnerware.

One purpose is to provide a molding foil of rayon paper impregnated with a plastic material for embedding in a plastic dinnerware product in the course of manufacture thereof.

Another purpose is to provide a spot-type molding foil effective to insure correct placement in relation to the plastic dinnerware item of which it shall become a decoration.

Another purpose is to provide substantial identity of spaced decorative patterns on an item of plastic dinnerware.

Another purpose is to provide a spot foil for use in the manufacture of plastic dinnerware items and having means for positioning and securing said spot foil in the course of manufacture of said items.

Another purpose is to provide a spot foil for use in the manufacture of plastic dinnerware items and effective to insure diametrically opposite positioning of substantially identical patterns on said items.

Another purpose is to provide a spot foil having means for securing the correct positioning of said foil at minimum risk of human error.

Other purposes will appear from time to time during the course of the specification and claims.

I illustrate my invention more or less diagrammatically in the accompanying drawings, wherein.

Like parts are indicated by like numerals throughout the specification and drawings.

Figure 1:
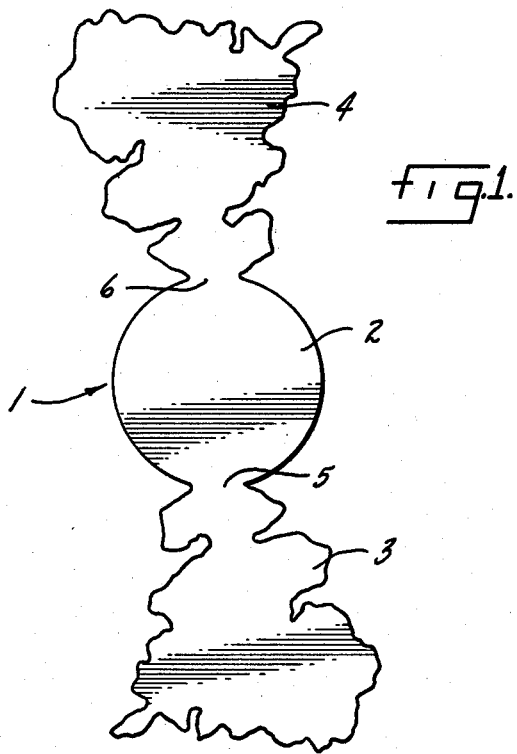
FIGURE 1 is a plan view.

Referring now to the drawings, and particularly to FIGURE 1, numeral 1 generally indicates the spot foil of the invention, the same being formed of a single sheet of rayon paper. The sheet 1 has a central positioning portion 2 which may take the general form of a circle though, as will be further described hereinbelow, the portion 2 may take a variety of planar configurations without departing from the nature and scope of the invention. Indicated at 3 and 4 are pattern or design portions of the sheet 1. It will be observed that the portions 3, 4 are identical, though they may vary somewhat without departing from the nature and scope of the invention. The portions 3, 4 extend in diametrically opposed directions from the central portion 2 and are joined thereto, respectively, by relatively thin or reduced neck segments 5, 6.

Figure 2:
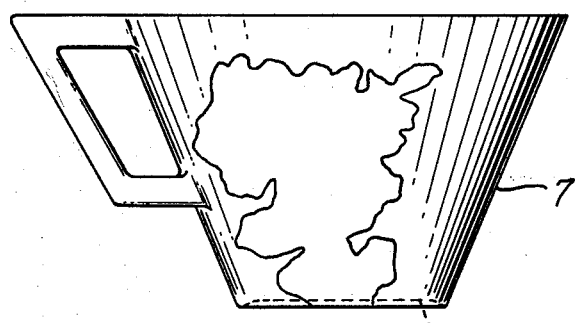
FIGURE 2 is a side elevation illustrating the invention in use.

FIGURE 2 illustrates the foil of the invention in place, the positioning portion 2 being beneath cup 7 and, in the form shown, being pressed within the circular foot 7a of cup 7.

The use and operation of my invention are as follows:

The plastic dinnerware item, for example, a cup, is placed in the mold. Before complete curing, the mold is opened and the outer surface of the cup is exposed. The spot foil of my invention is then placed on the cup with the positioning portion 2 in axial alignment with the center or vertical axis of the cup. The reduced neck portions lie against the foot or rim defining cup portion 7a to facilitate bending of the pattern portions toward the cup sides without crimping or distortion of the spot foil. With the pattern portions 3, 4 thus automatically diametrically positioned on opposite sides of the cup, the mold is again closed, and the molding cycle continues, thus causing the melamine-impregnated rayon paper foil 1 to become embedded in and integral with the plastic cup, the design or pattern of the portions 3, 4 being incorporated in the cup as a decoration thereof, the necessity for employing glue or other means to position patterns on the sides of cups or other dinnerware items being obviated.

Whereas I have described and claimed a perferred embodiment of the invention, it will be understood that further modifications will suggest themselves to those skilled in the art upon a reading of the foregoing specification. For example, the positioning portion 2 may take a planar configuration other than circular, to conform to the base portion of a cup or bowl or the like, without departing from the nature and scope of the invention. Accordingly, the foregoing description should be taken as merely illustrative and not definitive, and the scope of the invention should be limited only by the following appended claims.

I claim:

1. For use in combination with a cup-shaped plastic dinnerware item having a bottom provided with an external annular rim, a decorative foil comprised of a material compatible with the plastic from which the item is formed for integration into the surface of the item during molding thereof, said foil including a central portion and at least a pair of decorative pattern portions integrally connected to said central portion, said central portion being circular in configuration and having a peripheral edge engageable with said rim and the bottom area of the item bounded by said rim, said decorative pattern portions being engageable with the sides of the item and integrally connected to said central portion so as to overlie said rim, the point of connection between said central portion and said decorative pattern portions being of a width substantially less than the width of said first and second mentioned portions, said foil being applicable to said item during molding thereof at a point where the item is self-sustaining, but before the item is completely cured, said central portion when engaged with said rim and the bottom area of the item bounded by said rim defining a positioning means for the decorative pattern portions when the foil is first attached to the item and before the foil is integrated into the outer surface thereof during final curing of the item.

2. In combination with a cup-shaped plastic dinnerware item including a bottom provided with an annular external rim, an ornamental foil compatible with the plastic from which the item is formed incorporated into the outer surface of the item comprising a central circular portion positioned at the bottom of said item within the area bounded by said external rim, and having its peripheral edge lying in contact with the rim and at least a pair of decorative pattern portions extending upwardly along the sides of the item, said decorative pattern portions being connected to said central portion of said foil at said rim by connection points of a width substantially less than either said pattern portions or said central portion, said central portion acting as a positioning means for the pattern portion of said foil when said foil is first applied to said item and prior to integration of said foil into the body of the item during completion of molding thereof.

References Cited in the file of this patent

UNITED STATES PATENTS

| | | |
|---|---|---|
| 2,423,428 | Pollard | July 1, 1947 |
| 2,646,380 | Barlow et al. | July 21, 1953 |
| 2,797,180 | Baldanza | June 25, 1957 |